US010665928B2

(12) United States Patent
Fereidani et al.

(10) Patent No.: US 10,665,928 B2
(45) Date of Patent: May 26, 2020

(54) ADAPTIVE PHASED ARRAY ANTENNA ARCHITECTURE

(71) Applicants: Kaveh Fereidani, Waterloo (CA); Safieddin Safavi Naeini, Waterloo (CA)

(72) Inventors: Kaveh Fereidani, Waterloo (CA); Safieddin Safavi Naeini, Waterloo (CA)

(*) Notice: Subject to any disclaimer, the term of this patent is extended or adjusted under 35 U.S.C. 154(b) by 0 days.

(21) Appl. No.: 16/081,151

(22) PCT Filed: Mar. 6, 2017

(86) PCT No.: PCT/CA2017/050302
§ 371 (c)(1),
(2) Date: Aug. 30, 2018

(87) PCT Pub. No.: WO2017/152276
PCT Pub. Date: Sep. 14, 2017

(65) Prior Publication Data
US 2019/0058245 A1    Feb. 21, 2019

Related U.S. Application Data

(60) Provisional application No. 62/495,666, filed on Sep. 21, 2016, provisional application No. 62/389,632, filed on Mar. 4, 2016.

(51) Int. Cl.
*H01Q 1/24* (2006.01)
*H04B 7/08* (2006.01)
(Continued)

(52) U.S. Cl.
CPC ............ *H01Q 1/246* (2013.01); *H01Q 3/267* (2013.01); *H01Q 3/36* (2013.01); *H04B 7/0894* (2013.01)

(58) Field of Classification Search
CPC . H01Q 1/24; H01Q 3/267; H01Q 3/36; H04B 7/08
(Continued)

(56) References Cited

U.S. PATENT DOCUMENTS

2009/0315760 A1* 12/2009 Mousavi Bafrooei .... G01S 3/42
342/174
2015/0372361 A1* 12/2015 Abdellatif ............... H01P 1/184
333/133

OTHER PUBLICATIONS

International Patent Application No. PCT/CA2017/050302, International Preliminary Report on Patentability dated Sep. 13, 2018.
(Continued)

*Primary Examiner* — Andrea Lindgren Baltzell
(74) *Attorney, Agent, or Firm* — Borden Ladner Gervais LLP; Shin Hung

(57) ABSTRACT

An antenna system including a retro-directive adaptive phased array antenna, comprised of a group of antenna modules. There is a phasing cell in each antenna module that adds a certain amount of phase shift to the wireless transmit and receive signals in order to generate a pair of retro-directive radiation beams, such that the wireless transmit and receive beams are aligned to each other. Each phasing cell synthesizes the phase shift values for the transmit and receive beams using only one phase shifter. Therefore, as a beam forming algorithm changes the receive beam forming coefficients (i.e. the phase shifters values) to steer the receiving beam, the transmit beam will be automatically aligned to that of receive beam for arbitrary transmit and receive frequencies.

20 Claims, 11 Drawing Sheets

(51) Int. Cl.
*H01Q 3/36* (2006.01)
*H01Q 3/26* (2006.01)

(58) Field of Classification Search
USPC .......................................................... 343/702
See application file for complete search history.

(56) References Cited

OTHER PUBLICATIONS

International Patent Application No. PCT/CA2017/050302, International Search Report and Written Opinion dated Jun. 15, 2017.

\* cited by examiner

ADAPTIVE PHASED ARRAY ANTENNA ARCHITECTURE

CROSS REFERENCE TO RELATED APPLICATIONS

This application claims the benefit of priority of U.S. Provisional Patent Application No. 62/389,632 filed on Mar. 4, 2016, and of U.S. Provisional Patent Application No. 62/495,666 filed on Sep. 21, 2016, which are hereby incorporated by reference.

FIELD

The present disclosure relates generally to wireless communications. More particularly, the present disclosure relates to adaptive array antennas.

BACKGROUND

In many wireless communication scenarios, the characteristics of the wireless channel fluctuates due to the changes in the propagation environment or the relative movement of transmitter and receiver. As a result, the quality of the wireless link established over that channel between two nodes can be compromised. For example, a satellite in communication with a mobile base station can suffer from reduced signal quality due to atmospheric conditions, such as storms and other similar phenomena. By example, FIG. 1 is a diagram of a city environment with many buildings 10 of different sizes and shapes proximate to a car carrying or having integrated within, a wireless base station 14. The base station 14 is in wireless communication with a satellite 16 to receive an inbound signal 18. For example, a satellite 16 in communication with the mobile base station 14 can suffer from reduced signal quality due to the movement of the base station 14 which can deviate the orientation of base station antenna away from the satellite 16. Other phenomena such as an atmospheric condition 20 or reflection of the inbound 18 and outbound 22 signals from the surrounding buildings 10 can also have similar effects.

In general, the satellite 16 and the base station 14 may have relative movement to each other. By example, such wireless enabled mobile systems can include laptop computers and other portable computing devices such as smart phones and wearable devices. In the present age of the Internet of things (IoT), ground vehicles, airplanes and ships are now being outfitted with computing devices with wireless communication capabilities to enable complex mission-critical functions such as autonomous piloting and to provide relatively simple services such as entertainment media and Internet connectivity. In such examples, these wireless enabled mobile systems can communicate with a satellite and/or a wireless base station. Even when the base station 14 is not mobile, the satellite may not be geosynchronous, therefore in such a case the ground station should steer its receive and transmit beams to track the moving satellite.

While the example of FIG. 1 illustrates an outdoor application where two wireless nodes can establish a link there between, indoor applications are possible as well, where devices with respective wireless transceivers need to establish a link in order to communicate information with each other. In indoor applications, both nodes can be stationary, or one can move relative to the other. Accordingly, similar challenges are faced by indoor wireless systems as the outdoor wireless system shown in FIG. 1.

Ideally, the base station 14 and satellite 16 have a direct and unimpeded line of sight signal propagation path between each other in which an antenna of the base station 14 is configured to receive and transmit signals to the satellite 16 with optimum signal characteristics. An optimum signal characteristic can include signal to noise ratio (SNR), signal power, signal to interference ratio (SIR) etc.

Unfortunately in reality, the wireless transmission environment is similar to that shown in FIG. 1 where the direction of final received inbound signal 18 that reaches the base station 14 can constantly change due to the physical environment. Optimally the receiving beam of the antenna should point to the direction from which the wave is coming, i.e. direction 18, and the transmitting beam of the antenna should point to direction 22 that is parallel to that of inbound signal 18. The antenna of the base station 14 can be physically directed towards the direction 18/22, or in the case where the antenna is implemented as an active phased array antenna, beamforming techniques can be used to achieve the same effect. Those skilled in the art will understand that beam forming is a technique in which each sensor of an array of sensors can be independently configured to provide constructive interference of received or transmitted copies of the same wireless signal. Alternatively self-phased antennas can be used which are able to direct their transmit signal in the opposite direction from which they receive a signal.

An adaptive antenna can respond to the changes in the wireless channel and (partially) compensate the link degradation by optimizing its radiation pattern. Adaptive array antennas are the fusion of flexible pattern antennas and intelligent algorithms controlling the radiation pattern. The antenna part is usually an active phased array antenna (APAA) capable of electronic beam forming. APAA's are well-known in the art.

As is known in the art, in reception (Rx), the received signal strength or some other characteristics of the received signal can be used as a feedback to find and apply the optimal beam forming coefficients to the APAA in order to obtain the optimum signal characteristic for maximizing any desired quality of service (QoS) aspect. For example, a high signal to noise ratio (SNR) of the signal may be required in some applications. However, in transmission (Tx) there is no feedback to send a signal for reception with an optimized characteristic by the satellite 16, or other source node. In one possible solution for the example of FIG. 1, the base station 14 can include an active phased array antenna or a self-phased antenna in order to utilize the information of Rx beam to steer the Tx beam toward the same direction.

Conventional phased array antennas known in the art require characterization and/or calibration of the antenna array in order to accurately estimate the direction of source node and determine the optimal beam forming coefficients for transmitting a signal toward that source node. By example, the physical layout and orientation of each antenna module in the array of antennas must be known relative to each other and to the environment they are installed within. The characteristics of the electronics used in each antenna module comprising the array antenna must be known as they may also perform differently under different temperature conditions. Using the characterization data, the phased array can be calibrated for its non-idealities.

In the example of FIG. 1, a calibrated active phased array antenna at base station 14 can estimate the direction of incoming signal 18 and transmit in the opposite direction 22. Another type of active phased arrays known as fully passive phased arrays which require passive (and preferably low loss) phase shifters that have true delay line behavior over the range of transmit and receive frequency. The later type of phased arrays may not require characterization/calibration. However, the requirements of such phase shifters have limited their feasibility for many applications.

There are many conventional designs based on self-phasing techniques which can be used, but suffer from at least one of the following shortcomings: a) The antenna must be constantly illuminated by a single tone wave know as pilot (or beacon) tone; b) The antenna cannot operate at different Tx and Rx frequencies; c) The antenna cannot handle phase modulated signals or it needs to be redesigned for different modulation schemes; and d) The antenna is unable to steer its beam toward a specific signal source when there are more than one.

A significant amount of wireless communications are between devices in which at least one is mobile and/or the environment between the two ends of communication changes. Therefore there is a need to provide a method and system for determining optimum beam forming coefficients for an antenna array that optimizes at least one characteristic of an inbound received and outbound transmitted signal to a source node, that is low cost, does not require complex calibration procedures and computation, and does not suffer from at least one of the shortcomings outlined above in the conventional solutions.

SUMMARY

It is an object of the present disclosure to obviate or mitigate at least one disadvantage of previous antenna systems.

In a first aspect, the present disclosure provides an antenna system. The antenna system includes a central unit and an antenna array. The central unit is configured to generate control signals for setting beam receive parameters to beam form a received inbound wireless signal from a source to maximize a characteristic of the inbound wireless signal in accordance with a parameter optimization process, during a receive operation. The antenna array is configured by values of the control signals to apply first phase shifts to the received inbound wireless signal, and configured by the same values of the control signals to apply second phase shifts to a local outbound signal for setting beam transmit parameters to beam form an outbound wireless signal to the source. According to a present embodiment of the first aspect, the antenna array includes at least two antenna modules, and each of the at least two antenna modules receives a set of the control signals. In this aspect each of the at least two antenna modules includes a phasing cell Each phasing cell is configured to receive the inbound wireless signal and apply a receive phase shift to generate a local inbound signal in response to a value of a phase control signal of the received set of the control signals, and to receive the local outbound signal and apply a transmit phase shift to generate a global outbound signal in response to the value of the phase control signal.

According to aspects of the present embodiment the central unit is in wireless communication with the at least two antenna modules to receive the local inbound signal and to provide the local outbound signal. Additionally, the central unit can be configured to receive a source selection signal for monitoring characteristics of the received inbound signal corresponding to the source having a corresponding ID number.

In the present embodiment, the inbound wireless signal has a global receive frequency, the outbound wireless signal has a global transmit frequency different than the global receive frequency, the local inbound signal has a local receive frequency, and the local outbound signal has a local transmit frequency different than the local receive frequency. Alternately, the inbound wireless signal has a global receive frequency, the outbound wireless signal has a global transmit frequency the same as the global receive frequency, the local inbound signal has a local receive frequency, and the local outbound signal has a local transmit frequency the same as the local receive frequency. In either of these embodiments, the ratio of the global transmit frequency to the global receive frequency is equal to the ratio of the local transmit frequency to the local receive frequency, and is equal to the ratio of m1 to m2, where m1 and m2 are frequency multiplication factors.

According to further aspects of present embodiments, the phasing cell can include a first mixer, a second mixer and an adjustable local oscillator generator. The first mixer is configured to mix the local outbound signal with a transmit local oscillator signal to generate the outbound wireless signal. The second mixer is configured to mix the global inbound signal with a receive local oscillator signal to generate the local inbound signal. The adjustable local oscillator generator is configured to generate the transmit local oscillator signal and the receive local oscillator signal in response to the value of the phase control signal, where the ratio of a phase of the transmit local oscillator signal to a phase of the receive local oscillator signal is equal to the ratio of the global transmit frequency to the global receive frequency at each phasing cell.

The adjustable local oscillator generator can include a transmit and receive local oscillator phase shifting block, and a frequency multipliers circuit block. The transmit and receive local oscillator phase shifting block is configured to phase shift a received local oscillator signal to provide a first phase shifted local oscillator signal in response to the value of the phase control signal, and configured to conjugate the phase of the first phase shifted local oscillator signal to provide a second phase shifted local oscillator signal. The frequency multipliers circuit block is configured to generate the transmit local oscillator signal and the receive local oscillator signal, where the ratio of the phase of the transmit local oscillator signal to the phase of the receive local oscillator signal is equal to the negative ratio of frequency multiplication factors m1 to m2 applied to the first phase shifted local oscillator signal and the second phase shifted local oscillator signal.

The transmit and receive local oscillator generator can include a phase shifter and a phase conjugator. The phase shifter phase shifts the local oscillator signal in response to the value of the phase control signal for generating the first phase shifted local oscillator signal. The phase conjugator mixes the first phase shifted local oscillator signal with a frequency doubled version of the local oscillator signal to generate the second phase shifted local oscillator signal. Furthermore, the frequency multipliers circuit block can include a first frequency multiplier and a second frequency multiplier. The first frequency multiplier multiplies the first phase shifted local oscillator signal by m1 to provide the transmit local oscillator signal. The second frequency multiplier multiplies the second phase shifted local oscillator signal by m2 to provide the receive local oscillator signal.

According to an alternate embodiment, the adjustable local oscillator generator can include a phase conjugating phase shifter, and a frequency multipliers circuit block. The phase conjugating phase shifter is configured to generate a first pair of differential signals and a second pair of differential signals from a received differential local oscillator signal in response to the value of the phase control signal, where a first signal of the first pair of differential signals is conjugate of a first signal of the second pair of differential signals, and a second signal of the first pair of differential signals is conjugate of a second signal of the second pair of differential signals, and the amount of phase shift can be changed while the outputs are phase conjugated. The frequency multipliers circuit block is configured to convert the first and second pairs of differential signals into respective first and second single ended signals, and to multiply the frequencies of the first and second single ended signals by frequency multiplication factors m1 and m2 to provide the transmit local oscillator and the receive local oscillator signal, where the ratio of the phase of the transmit local oscillator signal to the phase of the receive local oscillator signal is equal to the ratio of frequency multiplication factors m1 to m2 applied to the first single ended signal and the second single ended signal.

In a second aspect, the present disclosure provides a method for controlling an antenna array. The method includes generating control signals for setting beam receive parameters to beam form a received inbound wireless signal from a source to maximize a characteristic of the inbound wireless signal in accordance with a parameter optimization process, during a receive operation; configuring the antenna array with the beam receive parameters for applying first phase shifts to the received inbound wireless signal in response to values of the control signals; and configuring the antenna array with beam transmit parameters for applying second phase shifts to a local outbound signal in response to the same values of the control signals to beam form an outbound wireless signal to the source in a transmit operation. In a first embodiment of the second aspect, the method further includes selecting the source in response to a source selection signal that corresponds to an ID number of the source, before generating the control signals. In a second embodiment, the step of generating control signals includes monitoring the characteristic of the inbound wireless signal, and changing values of the control signals in accordance with a parameter optimization process until the characteristic is maximized. In further aspects of the second embodiment, the method further includes receiving a further inbound wireless signal and determining if the characteristic has degraded to a predetermined threshold, and the step of generating control signals is repeated when the characteristics have degraded to the predetermined threshold.

In a third embodiment of the second aspect, configuring the antenna array with the beam receive parameters includes applying the first phase shifts to copies of the inbound wireless signal in response to the values of the control signals to obtain constructive interference of the phase shifted copies of the inbound wireless signal. In this embodiment, configuring the antenna array with the values of the control signals for setting beam transmit parameters includes applying the second phase shifts to copies of the local outbound signal in response to the values of the control signals to obtain constructive interference of the phase shifted copies of the local outbound signal to form the outbound wireless signal.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system which optimally forms a transmit beam aligned to an optimal receive beam after receiving an inbound signal from the source node. Instead of determining the optimum beam forming coefficients based on a physical location of the source node and numerous physical characteristics of the components of the antenna array, the proposed method and system configures the antenna to beam form the outbound signal in a direction that aligns with the direction of the beam formed inbound signal. Therefore, the transmitted outbound signal beam is always aligned with the received inbound signal beam.

The present embodiments describe an antenna system including a retro-directive adaptive phased array antenna, includes of a group of antenna modules. There is a phasing cell in each antenna module that adds a certain amount of phase shift to the wireless transmit and receive signals in order to generate a pair of retro-directive radiation beams, such that the wireless transmit and receive beams are aligned to each other. In the present embodiments, each phasing cell synthesizes the phase shift values for the transmit and receive beams using only one phase shifter. Therefore, as the beam forming algorithm changes the receive beam forming coefficients (i.e. the phase shifters values) to steer the receiving beam, the transmit beam will be automatically aligned to that of the receive beam.

In the present embodiments, a beam is understood to be the main lobe of the antenna pattern. In general, however, an antenna may have multiple beams (multiple lobes with considerable magnitude in comparison to its smaller side lobes). The antenna system embodiments described herein is capable of generating multiple beams for both receive and transmit operations in such a way that each receive beam has its own transmit beam aligned to it.

Figure 2:
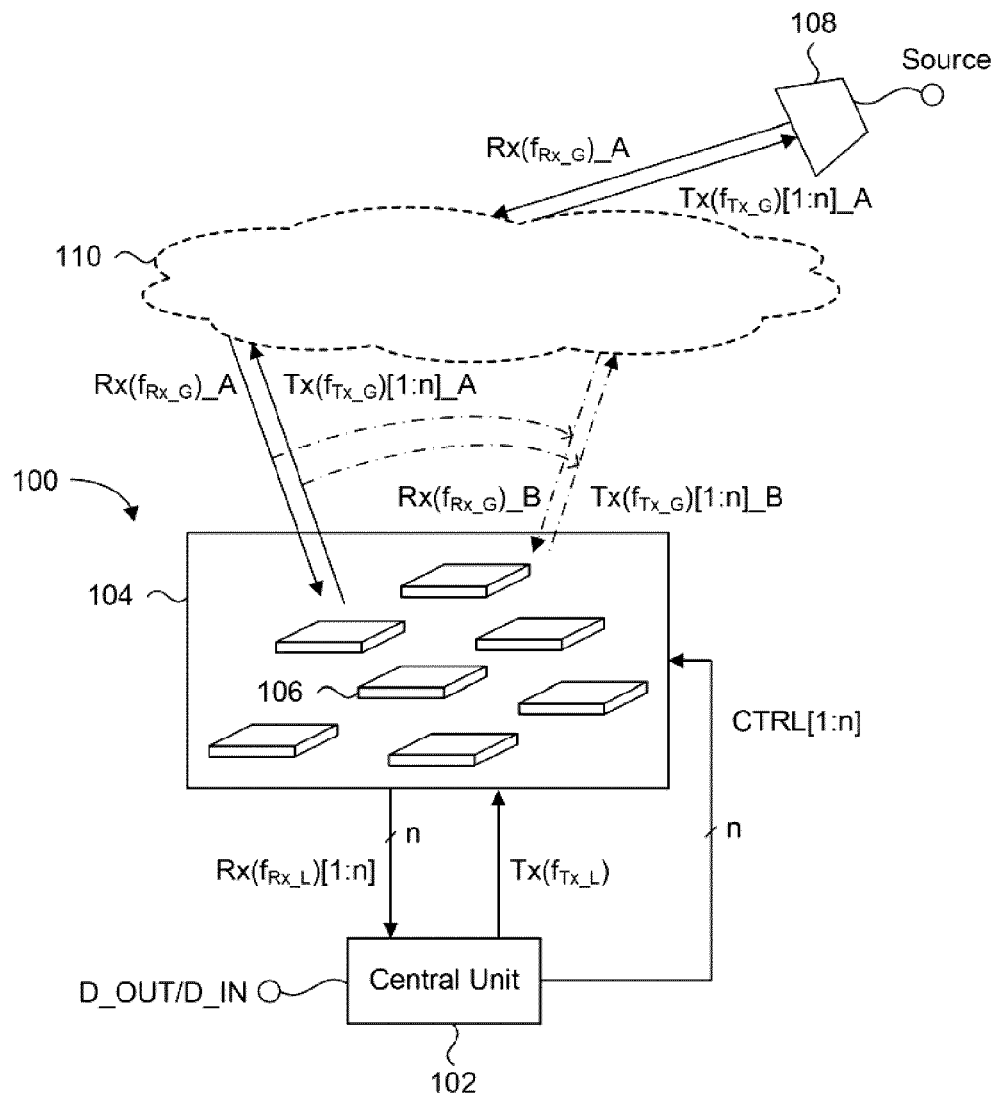
FIG. 2 is a diagram of a retro-directive adaptive phased array antenna (RDAPAA) system, according to a present embodiment.

FIG. 2 is a diagram of a retro-directive adaptive phased array antenna (RDAPAA) system, according to a present embodiment. From this point forward, embodiments of this system are simply referred to as the antenna system. In FIG. 2, the antenna system 100 includes a central unit 102 and a retro-directive phased array antenna 104. The retro-directive phased array antenna 104 includes a set of individual antenna modules, of which only one is labelled with reference number 106. While the present example shows a retro-directive phased array antenna 104 including seven antenna modules 106, any number of antenna modules can be used while a minimum of two antenna modules 106 is required. Furthermore, the physical arrangement of each antenna module 106 relative to the other can be arbitrary as can be the orientation in three-dimensional space of each antenna module 106 relative to the other. The physical distance between each antenna module 106 can be smaller than a predetermined value based on the wavelength of the transmit and receive signals, whichever is smallest, to avoid generation of grating lobes and/or a undesired antenna pattern, or spurious lobes for all desired scan angles. In the case of a planar arrangement of the antenna modules 106 by example, a maximum distance between adjacent antenna modules 106 of a half-wave length will allow for a −90 deg to +90 deg scan angle.

FIG. 2 shows the retro-directive phased array antenna 104 in wireless communication with a source node 108, represented by a satellite in this example. Therefore, the central unit 102 and the source node 108 represents the two communications nodes in which bidirectional wireless transmissions are to occur. In alternate variations of the presently shown embodiment of FIG. 2, the source node 108 can be a Wi-Fi transceiver, a Bluetooth transceiver, or any wireless format transceiver. Similarly, the central unit 102 is configured to communicate in the same standard or format as the source node 108. Both nodes 102 and 108 can be stationary, or mobile, or one of the two nodes is mobile while the other is stationary.

Figure 1:
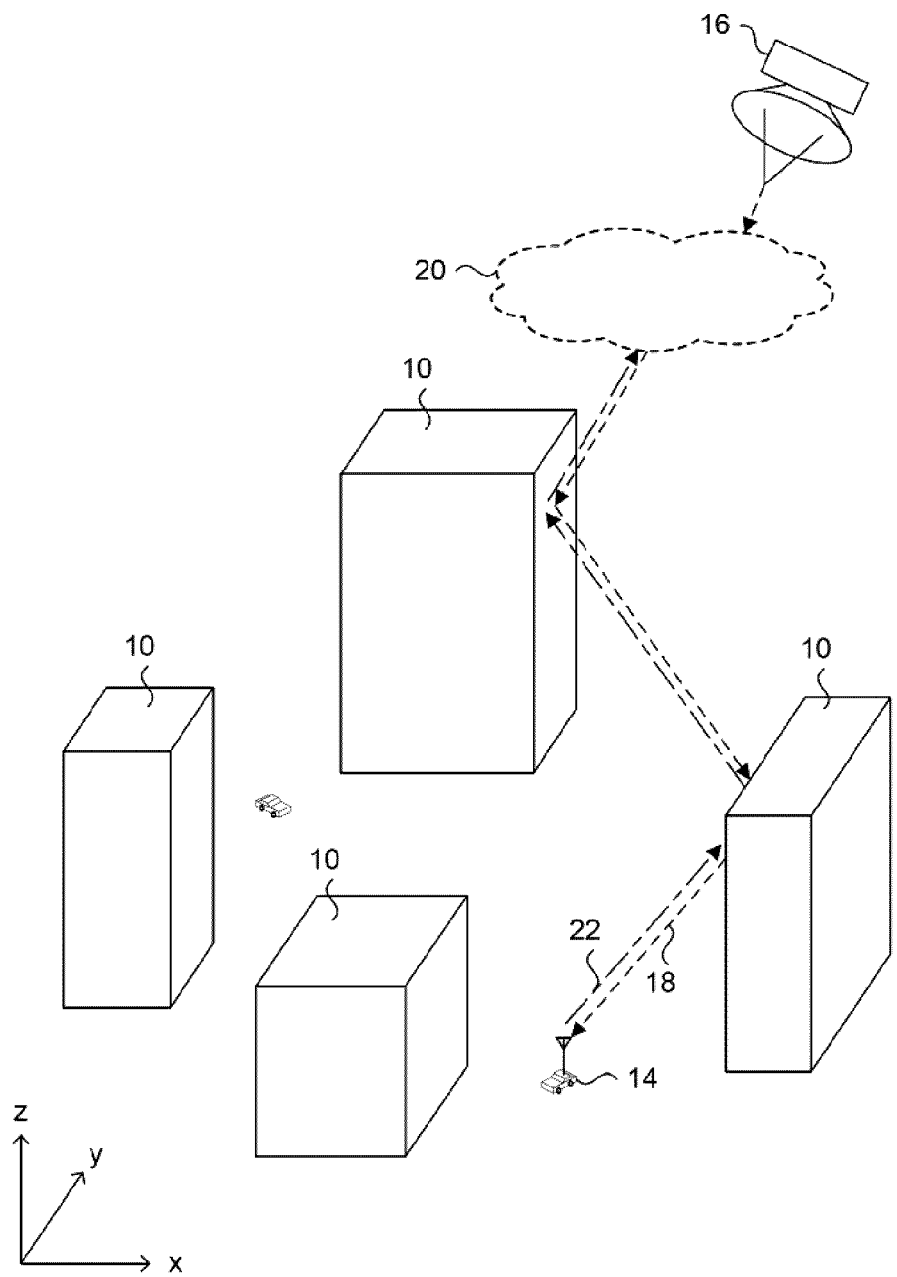
FIG. 1 is a diagram illustrating the prior art deployment of an antenna system.

The wireless signals are subject to physical environmental conditions which can affect the propagation path of inbound signals from the satellite 108 and outbound signals from the retro-directive phased array antenna 104. For the purposes of FIG. 2, these physical environmental conditions are represented by cloud 110 and can include physical obstructions such as mountains and buildings as shown in FIG. 1, and/or dynamically changing weather phenomena or simply the relative movement between the antenna system and the source nodes.

The central unit 102 receives a local inbound signal, shown as a set of local inbound signals $Rx(f_{Rx\_L})[1:n]$ from the group of antenna modules 106 of the retro-directive phased array antenna 104, where n is an integer value representing the number of antenna modules 106. This is because each antenna module 106 independently generates its own local inbound signal with slightly different characteristics, such that they constructively interfere with each other as seen by the central unit 102. Accordingly, there are up to n local inbound signals generated by the group of antenna modules 106 which are received in parallel by central unit 102. Each of the signals is received at a local receive frequency of $f_{Rx\_L}$. The receive data collectively carried by $Rx(f_{Rx\_L})[1:n]$ is extracted as D_IN, which can include demodulation of $Rx(f_{Rx\_L})[1:n]$, frequency translation to a lower carrier frequency, or simply passed directly without any transformation in an alternate embodiment. In the presently described example embodiments, $Rx(f_{Rx\_L})[1:n]$ is demodulated to base band.

There is a phase delay associated with the distance between the source node 108 and each antenna module 106 and from the antenna modules 106 to the central unit antenna location. The proper phase shift at each antenna module 106 is the value that compensates the abovementioned phase delays in order to create coherent combination of all signals coming from different antenna modules 106 at the antenna of the central unit 102. By setting the proper phase shift values, the received signal at the central unit is enhanced and the antenna array exhibits an antenna gain toward source node 108 due to the coherent combination of the signal coming from the antenna modules 106. This also means that the receiving beam of the antenna array is steered towards the source node 108.

In order to identify these proper phase shift values, the central unit 102 samples the combined set of local inbound signals $Rx(f_{Rx\_L})[1:n]$ for its power, SIR, SNR, etc., and executes an optimization algorithm to identify the optimum beam forming coefficients (such as a set of proper phase shifts by example) that results in a maximized characteristic of the combined $Rx(f_{Rx\_L})[1:n]$. Algorithms for determining the optimum receive beam forming coefficients algorithms are well-known in the art. An example of such a known algorithm is described in the paper titled "Zero-Knowledge Beamforming for Mobile Satellite Phased Array Antenna", authored by M. Fakharzadeh et al. and published in the 2008 IEEE 68th Vehicular Technology Conference digest in 2008, at pp. 1-5. doi: 10.1109/VETECF.2008.71. This process may be iterative, and in each iteration a different set of control signals CTRL[1:n] is provided to the retro-directive phased array antenna 104, where n is the integer value representing the number of antenna modules 106.

Therefore in the embodiment of FIG. 2, CTRL[1:n] represents n sets of control signals where each set is provided to one antenna module 106 and each set can include one or more control signals. These control signals can have voltage levels corresponding to binary values or analog values. It is noted that each antenna module 106 can receive one or more dedicated control signals. By example, an independent phase shift control signal can be provided to each antenna module 106 in order to adjust the phase of a global inbound signal $Rx(f_{Rx\_G})\_A$ that each antenna module 106 receives. It is noted that $Rx(f_{Rx\_G})\_A$ is transmitted with a global receive carrier frequency of $f_{Rx\_G}$. In an alternate embodiment, a phase shift control signal and at least one gain control signal can be provided to each antenna module 106, in which phase shifts are used to control the beam direction. In such an alternative embodiment, the gain controls can be used to execute a higher degree of control on the pattern (in addition to the direction the beam) of the antenna, especially on the side-lobe levels. Eventually, the optimization algorithm will converge upon a final set of control signal values of CTRL[1:n] based on present criteria or thresholds imposed by requirements and/or needs of the system design to optimize values in the antenna modules 106 for receive signal phase shifting.

The central unit 102 also receives transmit data D_OUT from the baseband processing device, and executes the reverse processing of D_IN. In the present example, the central unit 102 modulates D_OUT with a local transmit frequency of $f_{Tx\_L}$ to provide a single local outbound signal $Tx(f_{Tx\_L})$ to the group of antenna modules 106 of the retro-directive phased array antenna 104 in parallel. Alternately, D_OUT can be frequency translated to a different carrier frequency, or simply passed directly without any transformation. The local outbound signal $Tx(f_{Tx\_L})$ is transmitted at a local transmit frequency of $f_{Tx\_L}$.

However now instead of using complicated calculations to estimate the direction of the inbound signal and determine a new set of control signal values for beam forming a global outbound signal being transmitted from the retro-directive phased array antenna 104, the same final set of control signal values CTRL[1:n] determined during the receive operation optimization process are fixed and used to generate the optimal values for transmission phase shifting. No other input signals are required for the antenna modules 106 to generate the optimal values for transmission phase shifting, and no characterization/calibration of the antenna is needed as in the conventional phased arrays. Specific design parameters and circuit configurations are discussed later which describe the relationship between the optimum receive signal phase shifting values and the transmit signal phase shifting values due to the common set of control signals CTRL [1:n]. Therefore, any transmit beam from the retro-directive phased array antenna 104 is aligned with the receive beam, which can be towards any direction.

Collectively, the antenna modules 106 generates copies of a global outbound signals $Tx(f_{Tx\_G})[1:n]\_A$, each with a phase shift which may be different from the other due to the applied control signal values CTRL [1:n]. The set of signals $Tx(f_{Tx\_G})[1:n]\_A$ are each transmitted at the global transmit carrier frequency of $f_{Tx\_G}$, and constructively interfere with each other in coherent combination at the source node 108. In the presently disclosed embodiments, the antenna system 100 executes a beam forming optimization to only maximize the characteristic of a received beam. There is no beam forming optimization required for the global transmit beam. Consequently, there is no need to know any physical parameters of the present location, of the physical arrangement of the antenna modules 106, or the characteristics of antenna modules 106. For example, the components of each antenna module 106, such as a phase shifter, amplifiers and mixers, do not have to be identical to those same components in the other antenna modules. All that is required according to the present embodiments, is that all of the antenna modules 106 transmit and receive signals between the source node 108 and the central unit 102 with the same global and local frequencies. In a particular embodiment, the global inbound and outbound signal frequencies of the antenna modules 106 have identical frequency multiplication ratios, and the local inbound and outbound signal frequencies of the antenna modules 106 have identical frequency multiplication ratios.

If for some reason the present communication link with current source node 108 degrades due to a change in the physical environmental conditions 110, the relative movement between the nodes occur, or a different source node is selected for establishing a communication link, the antenna system 100 will execute the previously described optimization algorithm again to identify the optimum beam forming coefficients that results in a maximized characteristic of the new combined $Rx(f_{Rx\_L})[1:n]$ signal. This example situation is illustrated in FIG. 2 where a receive beam $Rx(f_{Rx\_G})\_B$ is received at a direction that is different from $Rx(f_{Rx\_G})\_A$. Once the proper beam forming coefficients are determined, a transmit operation can be executed resulting in the new transmit beam $Tx(f_{Tx\_G})[1:n]\_B$ being transmitted in the same direction as $Rx(f_{Rx\_G})\_B$.

Figure 3A:
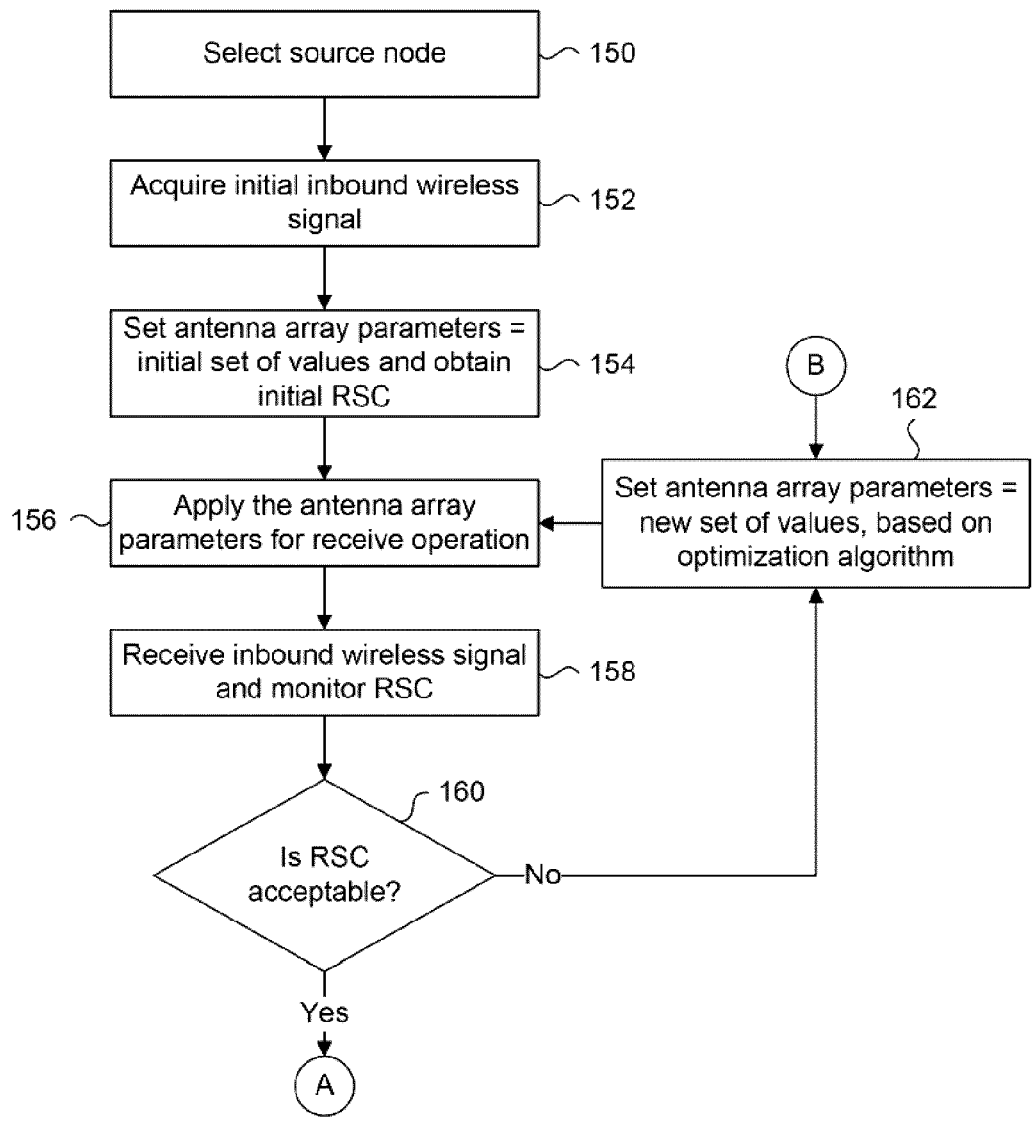
FIG. 3A and FIG. 3B is a method of operating the antenna system of FIG. 2, according to a present embodiment.
Figure 3B:
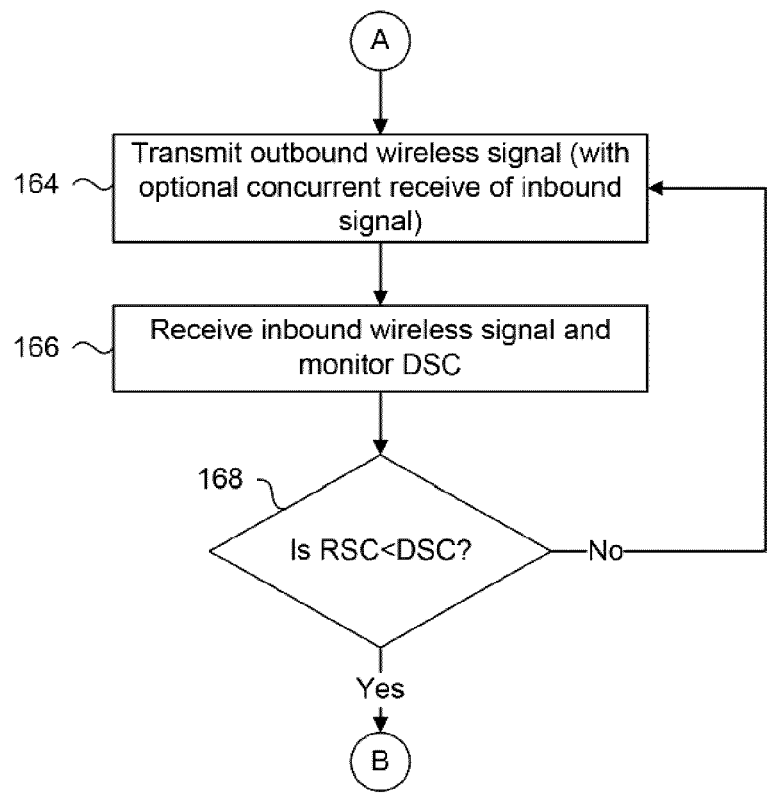

The flow chart shown in FIGS. 3A and 3B summarizes the method of operating the antenna system 100 of FIG. 2, according to a present embodiment. It is assumed at the beginning of the method that no communication link has been established between the antenna system 100 and a source node 108. The method begins in an acquisition mode, and the following described steps are part of the acquisition mode.

The first step 150 is to select a specific source node for establishment of a communications link, assuming that there are multiple possible source nodes which can be used. Once the source node has been selected, an initial inbound wireless signal from the selected source node 108 is acquired at step 152. At step 154 the antenna array parameters are set to be an initial set of values, which can be a random set of values or some preset starting set of values. In this example, the antenna array parameter values can adjust at least the phase of the inbound wireless signal. In the presently described embodiments, each antenna module [i] receives its own dedicated set of control signals CTRL[i] which carry the a set of values, while antenna module [i+1] receives a dedicated set of CTRL [i+1], which can be different from CTRL[i] (where i=1 to n). The set of antenna array parameters are applied to the antenna array at 156, and an inbound wireless signal from the source node is received and monitored at 158. In step 158 the received signal characteristic (RSC) of the received inbound wireless signal is monitored, where the signal characteristic can be signal power, SNR, SIR, etc. as previously mentioned. The RSC is compared to some predetermined threshold set by the system to maintain a QoS standard for any wireless communication format at step 160.

If the RSC is not acceptable, or does not meet the predetermined threshold, then the method proceeds to step 162 where the optimization algorithm selects a new set of values for the antenna array parameters. The method then loops back to step 156 where steps 158, 160 and 162 are repeated until the RSC is determined as being acceptable, or at least meeting the predetermined threshold at step 160, in response to one of the new set of values. Once the RSC is determined as being acceptable, the acquisition mode is complete, and the method proceeds to the tracking mode steps appearing in FIG. 3B. Now final beam forming coefficients that control phase and/or gain of each antenna module 106 are set in response to the last set of values for the antenna array parameters, and remain fixed for each antenna module 106 for both receive and transmit operations in the tracking mode of operation.

In the tracking mode transmission of an output wireless signal can start at 164 as shown in FIG. 3B while receiving an inbound wireless signal concurrently. In such an embodiment, it is assumed that full duplex operation is enabled. In a circuit configuration limited to half duplex operation, transmission and receive operations occur independently of each other. In either scenario, transmission of an output wireless signal at 164 is executed with no change to the values of the antenna array parameters. In the present embodiment, the same values of the antenna array parameters used to beam form the received inbound signal controls generation of a phase shift added to the outbound wireless signal. Another inbound wireless signal can be received at 166, at which point a determination is made at 168 to see if the RSC is less than the desired signal characteristics (DSC). If RSC is at least DSC, then the method loops back to 164 for further transmission of an outbound wireless signal at step 166. Otherwise, if RSC is less than DSC, then the method returns to step 162 of FIG. 3A, and the sequence of steps 156, 158, 160 and 162 iterates until RSC is acceptable and the method returns to step 164.

The tracking mode ends in the situation where RSC fails to reach the predetermined threshold in step 160 after a predetermined condition. This predetermined condition can include a predetermined number of iterations of steps 162, 156, 158 and 160, or a predetermined amount of time permitted to execute iterations of steps 162, 156, 158 and 160. Other conditions can be set to trigger exiting of the tracking mode. When the tracking mode is signaled to end, the method returns to the acquisition mode and restarts at step 150 where the same target node or a different source node is selected. Selection of the new source node can be done manually by receiving some input through an interface of the wireless device, or it can be done automatically with preset decision-making algorithms.

Accordingly, there may be applications where the antenna modules of the present embodiments can move relative to each other when installed on a surface which can dynamically change topology, such as a fabric or other bendable material, even when the antenna is operating. With the above described method, the system can dynamically make the necessary adjustments to compensate for this movement and maintain the beam at its optimal direction. The advantage of the present embodiments is that no relative location or positional information about the antenna modules relative to each other is needed in order to beam form the transmit signal. The placement of the antenna modules should take into consideration the range of movement due to the movable surface it is installed upon to ensure that any maximum movement avoids grating lobes and/or an undesired antenna pattern. Persons skilled in the art can understand that such details can be determined through testing or modelling.

Figure 4:
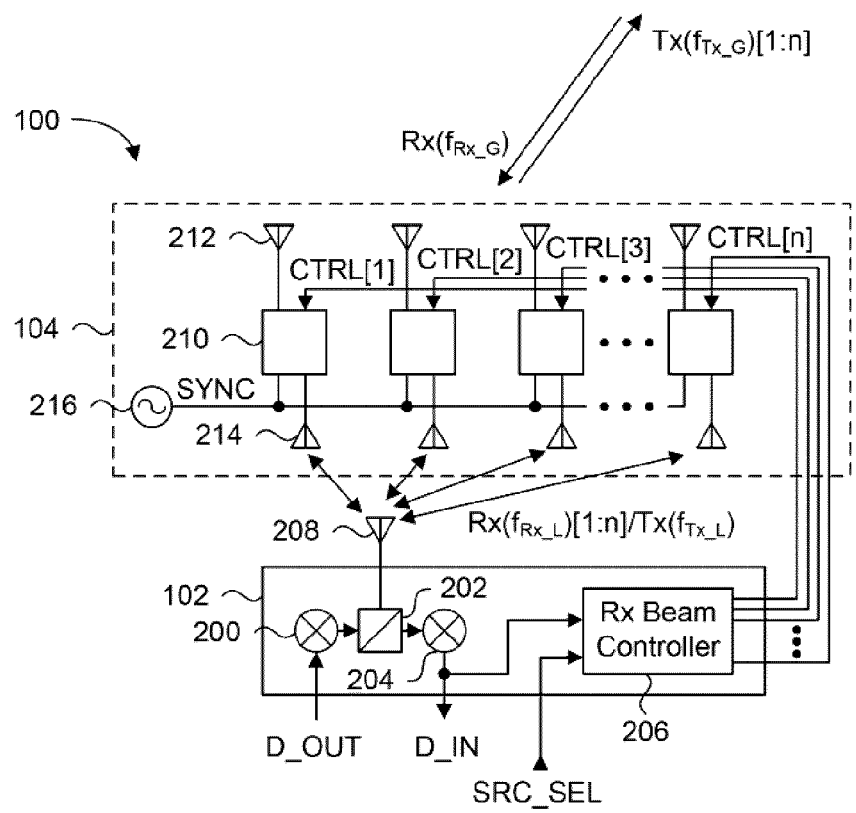
FIG. 4 is a block diagram showing further details of the antenna system of FIG. 2, according to a present embodiment.

FIG. 4 is a block diagram showing further details of the antenna system 100 of FIG. 2, in communication with a source node 108 (not shown). Following is a discussion of the central unit 102. The central unit 102 includes a modulator 200, a diplexer or switch 202, a demodulator 204, and a receive beam controller 206. The modulator 200 is configured to translate the received transmit data D_OUT into outbound signal $Tx(f_{Tx\_L})$ at the local transmit frequency of $f_{Tx\_L}$ from the central unit antenna 208. It is noted that modulator 200 and demodulator 202 are optional as the central unit 102 can receive the outbound modulated data on $f_{Tx\_L}$ and transmit the inbound modulated data on $f_{Rx\_L}$. The demodulator 204 is configured to translate the combined single local inbound signal resulting from the combination of local inbound signals $Rx(f_{Rx\_L})[1:n]$ received at central unit antenna 208, into the receive data D_IN. Diplexer 202 is a well-known circuit component that provides frequency-domain multiplexing and prevents the inbound and outbound signals from interfering with each other. The receive beam controller 206 executes the optimization algorithm to identify the optimum beam forming coefficients based on a sampling of the received data D_IN. Sets of control signals CTRL[1] to CTRL[n] (CTRL[1:n]) corresponding to these coefficients are output to the retro-directive phased array antenna 104. In the present example of FIG. 4, each set of control signals controls a phase shifter in each antenna module.

In the present embodiment there may be multiple source nodes 108 that the antenna system 100 can establish communication links with at any one time. After the optimization algorithm is executed for a specific source node 108, the final values for the sets of control signals CTRL[1:n] can be stored in a set of addressable registers or at an addressable location in a memory. The stored location of these values can be assigned to a specific source node selection value, which is selectable via a source selection signal SRC_SEL. This allows the antenna system 100 to execute on-the-fly application of any set of stored values to the phased antenna array 104 in response to a received SRC_SEL signal simply by providing a preassigned value of source selection signal SRC_SEL. SRC_SEL can therefore be a multi-bit value corresponding to any one of a plurality of source nodes. Accordingly, this feature allows for receive and transmit operations with the optimum RSC (Received Signal Characteristics) with a minimized lag time. As previously discussed such characteristics can include any one or more of signal power, SIR and SNR by example. The benefits of this feature are best realized in an embodiment where both the antenna system 100 and the source nodes 108 are stationary.

Following is a discussion of the retro-directive phased array antenna 104. As previously discussed, there can be any number of antenna modules 106 that form the retro-directive phased array antenna 104. Each antenna module 106 includes a phasing cell 210 a global antenna 212 and a local antenna 214. For the purposes of clarity in FIG. 4, only these components of one antenna module 106 are labelled with reference number is 210, 212 and 214. All of the phasing cells 210 receive in common, a synchronization signal SYNC from a master oscillator 216 to ensure that their local clocks are synchronized. The master oscillator 216 can be a part of the retro-directive phased array antenna 104 or can be provided external to the retro-directive phased array antenna 104. Instead of synchronizing the oscillators at each module with a master oscillator 216, more sophisticated techniques such as standing wave oscillators can also be used where all of the oscillators in the modules are coupled and synchronized together by standing waves. In a more simplified embodiment the local oscillator (not shown) of each phasing cell 210 can be omitted and the signal coming from the master oscillator 216 can be directly used instead provided that the SYNC signal that arrives at each of the phasing cells has the same phase as the SYNC signal that arrives at the other phasing cells. Clock signal distribution schemes are well-known in the art to compensate for propagation delays to ensure that various circuit elements are properly synchronized to the master signal.

Each phasing cell 210 receives a dedicated set of control signals CTRL[i], where i is a variable=1 to n, from the receive beam controller 206. In response to the received set of control signals, a phase of the global inbound signal $Rx(f_{Rx\_G})$ received by global antenna 212 is adjusted and transmitted via local antenna 214 to the central unit 102 as local inbound signal $Rx(f_{Rx\_L})[i]$. Therefore, copies of the global inbound signal are each phase shifted and transmitted to the central unit 102. In response to the same set of control signals, a phase of the local outbound signal $Tx(f_{Tx\_L})$ is shifted by the phasing cell 210 and transmitted as global outbound signal $Tx(f_{Tx\_G})[i]$ to the source node 108 (not shown in FIG. 4). Therefore, copies of the local outbound signal are each phase shifted and transmitted to the source node 108.

In the present embodiment, the global receive and transmit frequencies $f_{Rx\_G}$ and $f_{Tx\_G}$ have different frequency values, while the local receive and transmit frequencies $f_{Rx\_L}$ and $f_{Tx\_L}$ have different frequency values. Furthermore, the global and local receive frequencies differ from each other and the global and local transmit frequencies differ from each other. The design parameters for selecting these four frequency values is discussed in more detail later, where one of the purposes is to minimize interference between any of the transmitted and received signals.

In the present embodiment, the local inbound signals $Rx(f_{Rx\_L})[1:n]$ and the local outbound signals $Tx(f_{Tx\_L})$ are transmitted wirelessly between the phasing cells 210 and the central unit 102. In an alternate embodiment, conductive wires can be used instead to communicate the local inbound and outbound signals between the phasing cells 210 and the central unit 102. In such an alternate embodiment the antennas 214 of each phasing cell 210 and antenna 208 are replaced with direct wire connection ports for electrical coupling to each other. However, a wireless coupling configuration as shown in FIG. 4 benefits applications where it is impractical or impermissible to use direct wiring.

To summarize the operation of the antenna system 100 shown in FIG. 4, each phasing cell 210 receives a copy of the inbound global signal sent by a source node 108 at the global receive frequency $f_{Rx\_G}$. Then each phasing cell 210 adds a certain amount of phase shift (which can be different from one phasing cell 210 to another) to the received signal, and re-transmits it at a different local receive frequency $f_{Rx\_L}$, toward the central unit antenna 208. This phase shift applied to the inbound global signal by phasing cell [i] is now referred to as Phase_RX[i]. Once optimized, the applied set of final values for phase shift in each phasing cell 210 will result in coherent combination of all re-transmitted signals at the central unit antenna 208. Therefore when optimized, the control signals CTRL[1:n] are set. In the transmit operation, each phasing cell 210 receives a copy of the local outbound signal at the local transmit frequency $f_{Tx\_L}$, then adds an amount of phase shift based on the set of control signals CTRL[1:n]. This phase shift applied to the local outbound signal by phasing cell [i] is referred to as PHASE_TX[i]. In each phasing cell [i], the amount of phase shift PHASE_RX[i] differs from PHASE_TX[i] based on the common set of control signals CTRL[i] it receives. Expressed mathematically, PHASE_TX[i]=$(-f_{TX}/f_{RX})$ PHASE_RX[i], where $f_{TX}$ can be the global or local transmit frequencies and $f_{RX}$ can be the global or local receive frequencies.

The phase shifted signals from each phasing cell 210 is transmitted toward the source node 108 at the global transmit frequency $f_{Tx\_G}$. Similar to the reception operation, the phase shifts in the transmit operation will result in coherent combination of the signals re-transmitted by each phasing cell 210 at the source node 108, which means the transmit beam of the phased antenna array 104 is steered toward source node 108.

Figure 5:
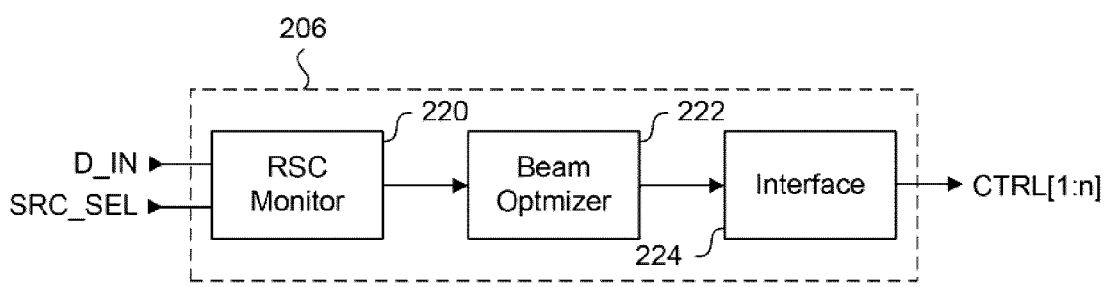
FIG. 5 is a block diagram showing further details of the receive beam controller shown in the embodiment of FIG. 4, according to a present embodiment.

FIG. 5 is a block diagram showing further details of the receive beam controller 206 shown in the embodiment of FIG. 4. According to the present embodiment, the receive beam controller 206 includes a received signal characteristic (RSC) monitor 220, a beam optimizer 222, and an interface circuit 224. The RSC monitor 220 measures one of the previously described characteristics of the received signal D_IN, and compares it against the desired signal characteristic (DSC). For example, in a simple case RSC can be the received signal strength and DSC can be a threshold value. The RSC monitor 220 can also have information relating to an identification number (ID number) of a particular source node 108, such as a satellite. In such embodiments, the satellite will broadcast its ID number and the receive beam controller 206 can execute the beam optimization algorithm to generate the optimum coefficients for the phasing cells 210. This allows the receive beam controller to ignore any strong signal power, SNR or other signal characteristic being monitored for optimizing the beam forming parameters from a source node that is undesired for establishing a wireless link with. As previously discussed, the value of source selection signal SRC_SEL can be preassigned to a corresponding known source node ID number, and each SRC_SEL corresponds to a unique source node ID number. Comparison logic in the RSC monitor 220 can simply compare the received ID number of D_IN to the received SRC_SEL value to select the proper global inbound global inbound signal Rx($f_{Rx\_G}$) to monitor.

In a further embodiment, once the finalized control signals CTRL[1:n] have been determined for a particular ID number, they can be stored in memory in the receive beam controller 206 for selection and application to the phasing cells 210, by SRC_SEL. By example, any number of finalized control signals for different ID numbers can be stored in interface circuit 224. This feature can have different possible applications. In one example application where all the nodes are stationary, accessing previously stored optimum parameters allows the system to immediately enter the tracking mode of operation as the acquisition mode is no longer necessary. In the example application where one of the nodes is mobile, the previously stored optimum parameters can be used as the initial set of values in the method of FIG. 3A.

The beam optimizer 222 uses RSC as its input and a decision output from the RSC monitor 220 indicating that further optimization is required, and executes well-known algorithms for converging upon a new set of parameters. These parameters are then provided to the hardware interface 224 that generates the sets of control signals CTRL[1:n] corresponding to the new set of parameters.

Figure 6:
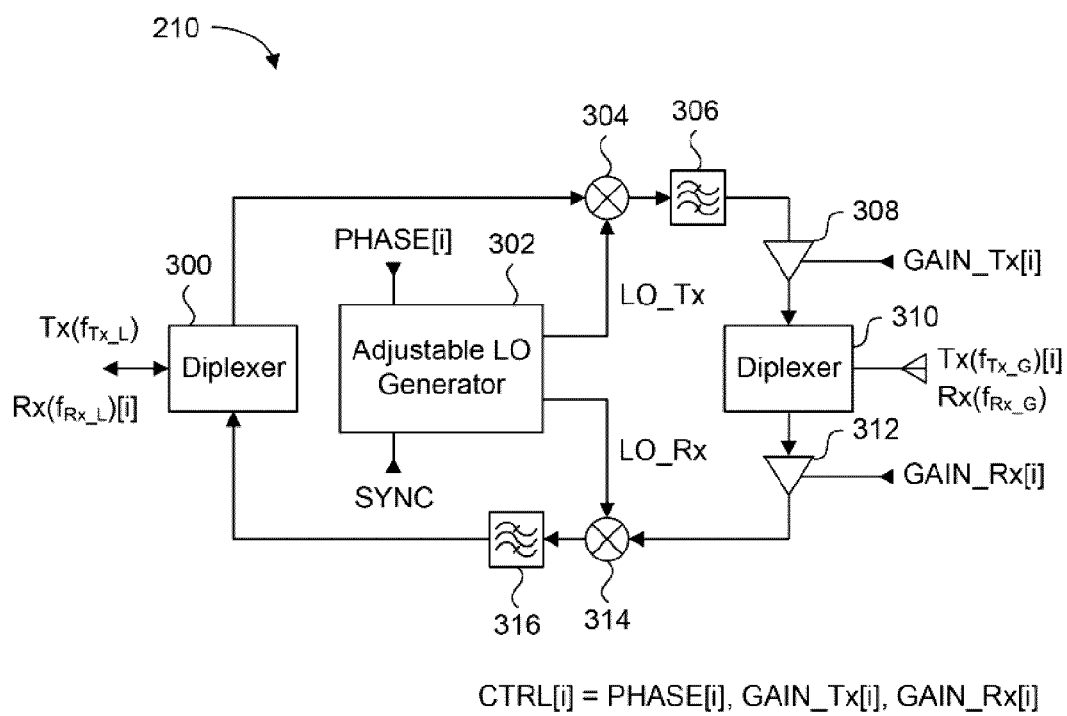
FIG. 6 is a block diagram of a phasing cell shown in FIG. 5, according to a present embodiment.

FIG. 6 is a block diagram of a phasing cell 210 shown in FIG. 5, according to a present embodiment. The phasing cell 210 of the present embodiment includes a first diplexer 300, an adjustable local oscillator (LO) generator 302, a transmit mixer 304, a transmit filter 306, a first optional variable gain amplifier (VGA) 308, a second diplexer 310, a second optional VGA 312, a receive mixer 314 and a receive filter 316. Diplexers 300 and 310 can be for example, a non-reciprocal circulator or a switch for time division multiplexing systems. The first optional amplifier 308 can a power amplifier, and the second optional VGA 312 can be a low noise amplifier. While amplitude adjustment using VGA 308 and VGA 312 is not necessary for the disclosed embodiments, they may be included to provide higher degrees of control over the shape of the radiation pattern, especially in controlling the side lobe levels.

In the present embodiment of FIG. 6, the set of control signals CTRL[i] include a phase adjustment signal PHASE [i], a transmit gain control signal GAIN_Tx[i], and a receive gain control signal GAIN_Rx[i]. The variable "i" can be an integer value associated with a particular phasing cell 210 in the retro-directive phased array antenna 104.

The phasing cell 210 has a transmit path and a receive path. In the transmit path, diplexer 300 receives and passes local outbound signal Tx($f_{Tx\_L}$) to the transmit mixer 304, which then converts the signal to the global transmit carrier frequency of $f_{Tx\_G}$. In this mixing process the phases of LO_Tx is added to the signal in the transmitting path. The signal LO_Tx is a local oscillator signal having a predetermined frequency set for the transmit path. The phases of LO_Tx is PHASE_Tx[i] and this is the phase added to the outbound signal during the mixing process as transmit phase adjustment. Transmit phase adjustment PHASE_Tx[i] is generated by the adjustable LO generator 302 in response to PHASE[i]. After some filtering by transmit filter 306 to remove unwanted-mixing products, amplification of the signal can be applied by VGA 308. The amount of gain applied by VGA 308 is adjusted by the applied transmit gain control signal GAIN_Tx[i] specific to this particular phasing cell 210. This final signal is transmitted through an antenna via diplexer 310 as a global outbound signal Tx($f_{Tx\_G}$)[i].

In the receive path, the global inbound signal $Rx(f_{Rx\_G})$ received at the antenna is passed to VGA 312 via diplexer 310. Amplification of the signal can be applied by VGA 312, the amount of gain being adjusted by the applied receive gain control signal GAIN_Rx[i]. As previously indicated, VGA 308 and VGA 312 are both optional. Assuming VGA 312 is used, the amplified signal still at the global carrier frequency $f_{Rx\_G}$ is converted to the local receive frequency $f_{Rx\_L}$ by receive mixer 314 where the phase of LO_Rx is added to the received signal. The signal LO_Rx is a local oscillator signal having a predetermined frequency set for the receive path. The phases of LO_Rx is PHASE_Rx[i] at [$i^{th}$] phasing cell 210, and this is the phase added to the inbound signal during the mixing process. Receive phase adjustment PHASE_Rx[i] is generated by the adjustable LO generator 302 in response to PHASE[i]. After any unwanted mixing products is removed by receive filter 316, the resulting signal is transmitted to the central unit as local inbound signal $Rx(f_{Rx\_L})$[i] via diplexer 300. As will be described in further detail with respect to the later figures, adjustable LO generator 302 is responsible for generating local oscillator signals LO_Rx and LO_Tx at their predetermined frequencies with the phase shifts PHASE_Tx[i] and PHASE_Rx[i] which are both controlled by the same control signal PHASE[i].

Figure 7:
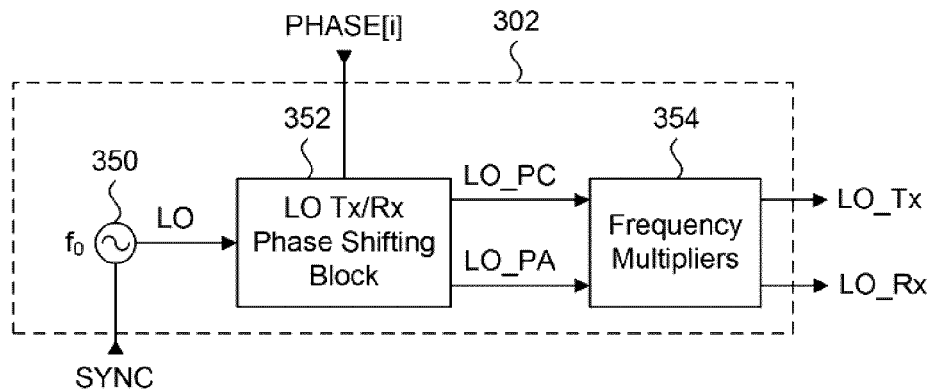
FIG. 7 is a block diagram showing further details of the adjustable LO generator shown in FIG. 6, according to a present embodiment.

FIG. 7 is a block diagram showing further details of the adjustable LO generator 302 shown in FIG. 6, according to a present embodiment. The adjustable LO generator 302 includes a local oscillator 350, a transmit and receive local oscillator phase shifting block 352, and a frequency multipliers circuit block 354. The local oscillator 350 is preset at frequency $f_0$ and synchronized with the local oscillators of all the other phasing cells 210 by master oscillator signal SYNC. As previously mentioned, the local oscillator 350 can be omitted and the local oscillator signal can be provided directly to the transmit and receive local oscillator phase shifting block 352 directly, such as via the same port that SYNC is received at. The generated local oscillator signal LO is then passed to transmit and receive local oscillator phase shifting block 352, that generates two distinct transmit and receive local oscillator signals with applied phase shifts PHASE_Rx for LO_PA and PHASE_Tx[i] (that is equal to −PHASE_Rx[i]) for LO_PC as controlled by PHASE[i]. The "−" sign in front of PHASE[i] indicates it is phase conjugated. This is shown as a first intermediate local oscillator signal LO_PC, which is a phase shifted and phase conjugated version of LO, and a second intermediate local oscillator signal LO_PA, which is simply a phase shifted version of LO.

These intermediate local oscillator signals are then received by the frequency multipliers circuit block 354 where both there frequency and phase are scaled by frequency multiplication factors. As will be discussed later, the multiplication factors applied to LO_PA and LO_PC can be expressed as m1 and m2, with different combinations thereof being applied to LO_PA and LO_PC. Frequency multipliers circuit block 354 converts LO_PC into LO_Tx, and converts LO_PA into LO_Rx, where LO_Tx and LO_Rx are converted into different frequencies. Alternatively, the inputs into frequency multipliers circuit block 354 can be swapped such that LO_PA is converted into LO_Tx and LO_PC is converted into LO_Rx. This has no effect upon the operation of the system, and the design parameters for the frequencies which are described later still apply.

Figure 8:
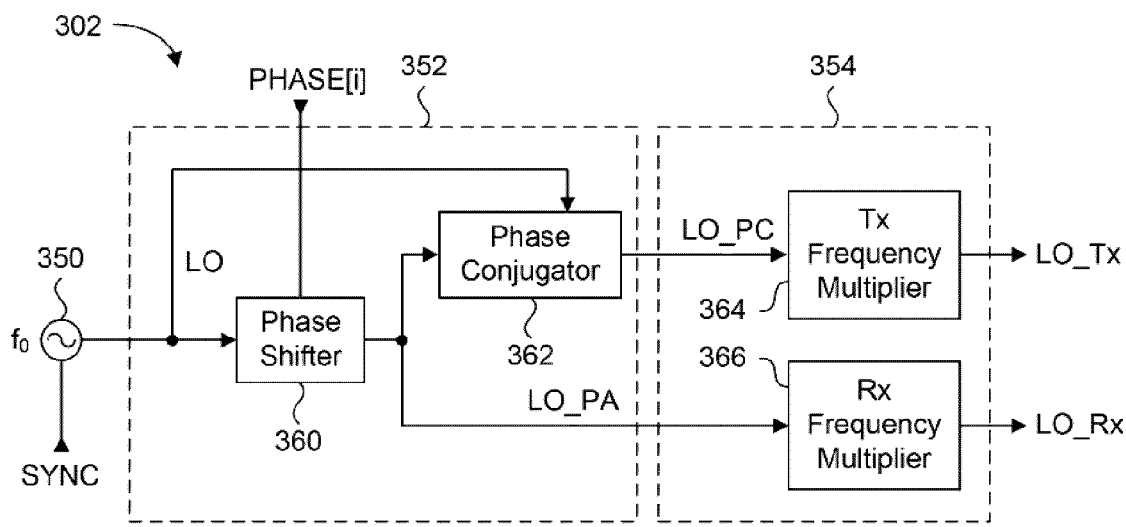
FIG. 8 is a block diagram showing yet further details of the adjustable LO generator shown in FIG. 7, according to a present embodiment.

FIG. 8 is a block diagram showing yet further details of the adjustable LO generator 302 shown in FIG. 7, according to a present embodiment. The difference between FIG. 8 and FIG. 7 is that FIG. 8 shows additional components of the transmit and receive local oscillator phase shifting block 352 and of the frequency multipliers circuit block 354. In the present embodiment, the transmit and receive local oscillator phase shifting block 352 includes a phase shifter 360 and a phase conjugator 362. The phase shifter 360 receives LO and changes the phase to generate the phase adjusted version LO_PA in response to control signal PHASE[i]. The phase shifter 360 can be implemented with any well-known phase shifting circuits such as for example vector summing circuits, loaded-lines, reflect-type, switched-network or switch-lines, and tunable materials. Depending on the specific phase shifter circuit being used, control signal PHASE[i] can either be a multibit digital signal or an analog voltage/current signal.

Figure 9:
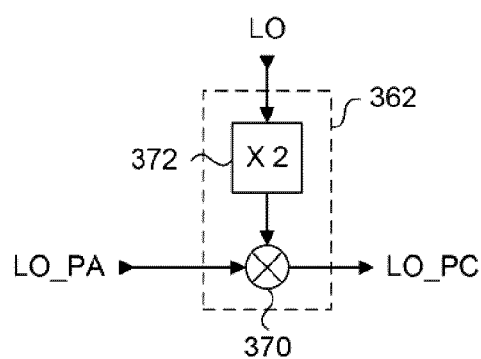
FIG. 9 is a circuit diagram of the phase conjugator shown in FIG. 8.

The phase conjugator 362 receives LO_PA generated by phase shifter 360, and conjugates its phase to generate LO_PC, which is a phase conjugated version of LO_PA and vice versa. The phase conjugator 362 can include circuits well-known in the art, such as a heterodyne mixing technique as shown in FIG. 9. In FIG. 9 the phase conjugator 362 includes a mixer 370 and a frequency doubler 372. This particular circuit mixes LO at twice its frequency with the phase adjusted version LO_PA. Depending on the circuit design of the mixer 370 there may be unwanted mixing products at the output at frequency of $3f_{LO}$ which can be removed by any known filtering technique.

The frequency multipliers circuit block 354 includes a pair of frequency multipliers 364 and 366. The transmit frequency multiplier 364 applies a first multiplication factor m1 to LO_PC to generate LO_Tx. The receive frequency multiplier 366 applies a second multiplication factor m2 to LO_PA to generate LO_Rx. Both multiplication factors m1 and m2 are integer values. According to the present embodiments, it does not matter what the specific first and second multiplication factor values are set for transmit frequency multiplier 364 and receive frequency multiplier 366. However, some values of m1 and m2 can result in a more simplified circuit implementation than others. Following is a detailed discussion of how the frequencies of the antenna system of the present embodiments can be selected, in relation to the multiplication factors m1 and m2.

The RF frequencies for the global inbound and global outbound signals, $f_{Rx\_G}$ and $f_{Tx\_G}$ are given by the required transmit and receive frequencies on which the antenna should operate. The intermediate frequencies (IF) for the local inbound and local outbound signals, $f_{Rx\_L}$ and $f_{Tx\_L}$, can be set by the system designer. For the present embodiments, the ratio between the IF frequencies is fixed to be the same as the ratio between the RF frequencies. Equation 1 below mathematically defines this relationship.

$$\frac{f_{Tx\_G}}{f_{Rx\_G}} = \frac{f_{Tx\_L}}{f_{Rx\_L}} \qquad \text{Equation 1}$$

It is noted that the frequencies mentioned in Equation 1 are preferably carrier frequencies of narrow band modulated local and global signals. Therefore, Equation 1 does not need to be exact, it can be approximately true within the actual bandwidth of the signals at the expense of some non-idealities in coherent signal combinations at the central unit 102 and the source node 108.

The LO_Tx and LO_Rx are the local oscillator signals for transmit mixer 304 and receive mixer 314 respectively. The LO_Tx and LO_Rx signals should have certain frequencies and phases. The frequency of LO_Tx and LO_Rx can be determined by the RF and IF frequencies. In the following discussion, example frequency configurations and the parameters for their selection are explained.

In one frequency configuration of the antenna system of the present embodiments using the adjustable LO generator 302 of FIG. 8, the IF frequencies $f_{Rx\_L}$ and $f_{Tx\_L}$, the first and second multiplication factors m1 and m2, and the frequency $f_0$ are determined by the following system design equations of equation 1 above, equation 2 and equation set 3 below.

$$\frac{f_{Tx\_G}}{f_{Rx\_G}} = \frac{m1}{m2} \quad \text{Equation 2}$$

Similar to Equation 1, Equation 2 does not need to be exact. Therefore, the right hand side value can be rounded to a rational number represented by m1/m2.

Accordingly, the ratio of frequencies $f_{Tx\_G}$ and $f_{Rx\_G}$ is the same as the ratio of multiplication factors m1 and m2. Using equations 1 and 2 above and the previously described relationship between PHASE_Tx[i] and PHASE_Rx[i], the relationship between the phases, the frequencies and the multiplication factors can be expressed as:

(PHASE_Tx[i]/PHASE_Rx[i])=(-$f_{TX}/f_{RX}$)=(-m1/m2), where the "-" sign indicates the phases are conjugate of each other.

Depending on the mode of mixers 304 and 314 (upper side band—USB, or lower side band—LSB) the frequency of the local oscillator, $f_0$, can be determined from either one of the following three design options in equation set 3:

Equation Set 3

TxMixer(USB),RxMixer(LSB1): $m1f_0 = f_{Tx\_G} - f_{Tx\_L}$    i)

TxMixer(LSB1),RxMixer(USB): $m1f_0 = f_{Tx\_L} - f_{Tx\_G}$    ii)

Figure 10:
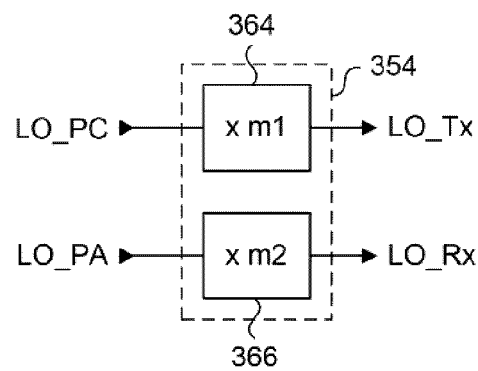
FIGS. 10, 11 and 12 are example configuration embodiments of the frequency multipliers circuit block shown in FIG. 8.

TxMixer(LSB2),RxMixer(LSB2): $m1f_0 = f_{Tx\_G} + f_{Tx\_L}$    iii)

where:
Tx Mixer USB mode: $f_{Tx\_L} < f_{Tx\_G}$
Tx Mixer LSB1 mode: $f_{LO\_Tx} < f_{Tx\_L}$
Tx Mixer LSB2 mode: $f_{LO\_Tx} > f_{Tx\_L}$
Rx Mixer USB mode: $f_{Rx\_L} > f_{Rx\_G}$
Rx Mixer LSB1 mode: $f_{LO\_Rx} < f_{Rx\_G}$
Rx Mixer LSB2 mode: $f_{LO\_Rx} > f_{Rx\_G}$ For given global transmit and global receive frequencies, $f_{Tx\_G}$ and $f_{Rx\_G}$, any one of the equations i), ii) and iii) of equation set 3 can be used, and then $f_{Tx\_L}$ and m1 can be selected to find $f_0$. Then, from equation 1 and equation 2, $f_{Rx\_G}$ and m2 can be determined. In the embodiment of FIG. 10, it is noted that a smaller multiplication factors, m1 and m2, can be implemented with less complexity in circuits than larger multiplication factors.

Figure 11:
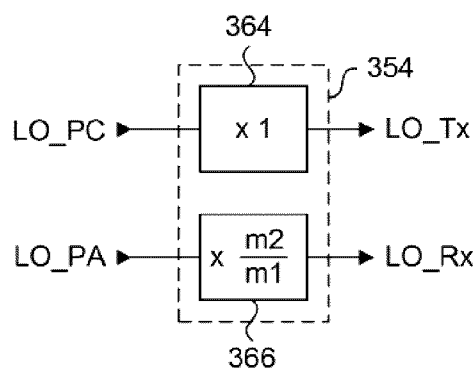
Figure 12:
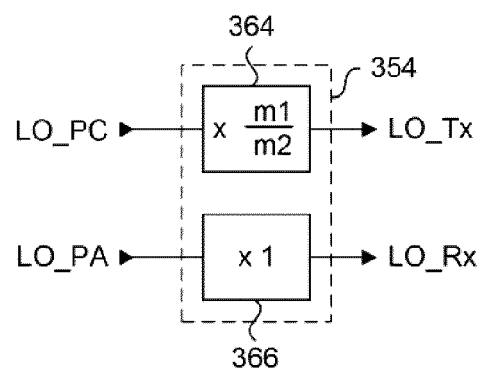

Reference is made to the example embodiments of FIG. 10, FIG. 11 and FIG. 12 which show different ways in which multiplication factors m1 and m2 can be applied to the signals LO_PC and LO_PA, while maintaining the common multiplication ratio between them. FIG. 10 shows a first example embodiment of frequency multipliers circuit block 354, in which transmit frequency multiplier 364 is configured to multiply the frequency of LO_PC by m1 while the receive frequency multiplier 366 is configured to multiply the frequency of LO_PA by m2.

FIG. 11 shows a second example embodiment where the transmit frequency multiplier 364 is configured to bypass any multiplication of LO_PC such that the frequency of LO_Tx is the same as that of LO_PC (in other words the LO_Tx port is directly connected to LO_PC). On the other hand, the receive frequency multiplier 366 is configured to multiply the frequency of LO_PA by m2 and then divided by m1. Accordingly, a fractional frequency multiplier is applied in the receive frequency multiplier 366. If such a configuration is used, any one of the design options in equation set 4 below are used, in conjunction with equation 2.

Equation Set 4

TxMixer(USB),RxMixer(LSB1): $f_0 = f_{Tx\_G} - f_{Tx\_L}$    i)

TxMixer(LSB1),RxMixer(USB): $f_0 = f_{Tx\_L} - f_{Tx\_G}$    ii)

TxMixer(LSB2),RxMixer(LSB2): $f_0 = f_{Tx\_G} + f_{Tx\_L}$    iii)

FIG. 12 shows a third example embodiment where the receive frequency multiplier 366 is configured to bypass any multiplication of LO_PA such that the frequency of LO_Rx is the same as that of LO_PA (in other words the LO_Rx port is directly connected to LO_PA). On the other hand, the transmit frequency multiplier 364 is configured to multiply the frequency of LO_PC by m1 and then divided by m2. In this example, a fractional frequency multiplier is applied in the transmit frequency multiplier 364. If such a configuration is used, any one of the design options in equation set 5 below are used, in conjunction with equation 2.

Equation Set 5

TxMixer(USB),RxMixer(LSB1): $m1f_0/m2 = f_{Tx\_G} - f_{Tx\_L}$    i)

TxMixer(LSB1),RxMixer(USB): $m1f_0/m2 = f_{Tx\_L} - f_{Tx\_G}$    ii)

TxMixer(LSB2),RxMixer(LSB2): $m1f_0/m2 = f_{Tx\_G} + f_{Tx\_L}$    iii)

The example multiplication factor configurations shown in FIG. 10, FIG. 11 and FIG. 12 maintain a common multiplication ratio between m2 and m1. These examples are not intended to be exhaustive, and other configurations can be used.

While any of the options of equation set 3 can be used, option i) results in lower IF frequencies, $f_{Tx\_L}$ and $f_{Rx\_L}$, which makes design and implementation of the circuit easier. Accordingly, lower development costs and better signal quality will result depending on the design choices that are made, although use of options ii) or iii) will provide functioning antenna system embodiments as well. Overall, provided the parameters of equation 1 are satisfied, any types of mixers can be used and any implementable frequency configurations in which there is enough separation between the different frequencies in the circuit can be used in order to avoid any overlap of out of band interference between the different carrier frequencies. For example in alternate embodiments, any type of mixer can be used where unwanted sidebands can be removed with subsequent filtering, or a single side band mixer could be used instead.

The adjustable LO generator embodiment of FIG. 8 illustrates one possible technique for generating the transmit path local oscillator signal LO_Tx and a receive path local oscillator signal LO_Rx, phase shifted relative to the local oscillator signal $f_0$ and phase conjugated from each other (i.e. Phase$_{LO\_Tx}$/Phase$_{LO\_Rx}$=-m1/m2). In an alternate embodiment, phase conjugation is executed in a phase conjugating phase shifter (PCPS).

Figure 13:
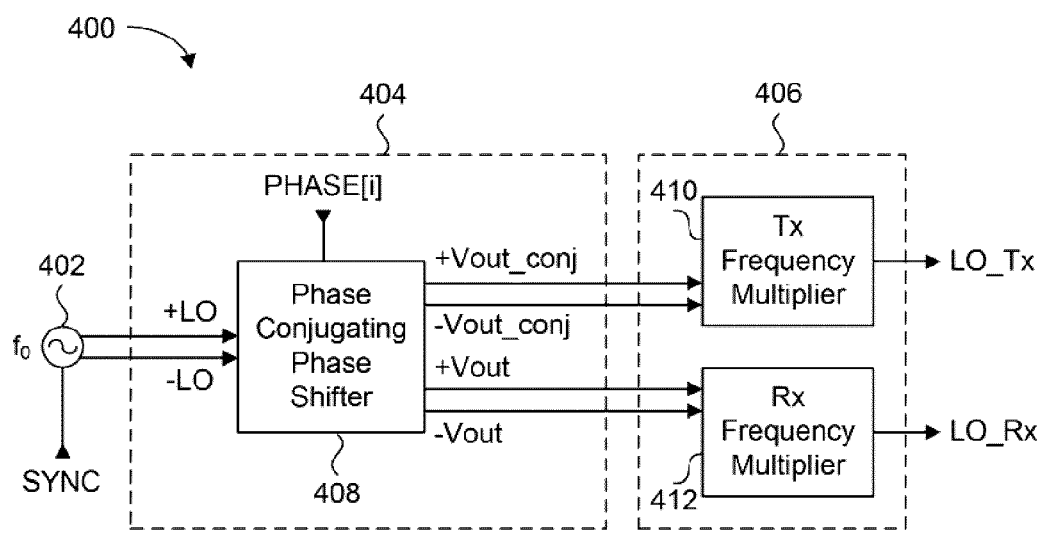
FIG. 13 is a block diagram of an adjustable LO generator, according to an alternate embodiment.

FIG. 13 shows this alternate embodiment of an adjustable LO generator 400, which includes a local oscillator 402, a transmit and receive local oscillator phase shifting block 404, and a frequency multipliers circuit block 406. Functionally, these are the same components as numbered elements 350, 352 and 354 respectively which were previously described in the embodiment of FIG. 8. The transmit and receive local oscillator phase shifting block 404 includes a phase conjugating phase shifter 408. As previously mentioned, the local oscillator 402 can be omitted and the differential local oscillator signals can be provided directly to phase conjugating phase shifter 408 directly, such as via the same port that SYNC is received at. The frequency multipliers circuit block 406 includes a transmit frequency multiplier 410 for applying multiplication factor m1 and a receive frequency multiplier 412 for applying multiplication factor m2.

In this particular embodiment, the local oscillator signal is provided as differential signals +LO and −LO. The PCPS 408 receives the differential signals +LO and −LO and applies a phase shift in response to control signal PHASE [i]. Two pairs of differential signals are generated from PCPS 408, the first pair being +Vout_conj and −Vout_conj, and the second pair being +Vout and −Vout. In this embodiment, +Vout_conj and +Vout are phase conjugates of each other, while −Vout_conj and −Vout are phase conjugates of each other. More specifically, PHASE(+Vout_conj)=−PHASE(+Vout) and PHASE(−Vout_conj)=−PHASE(−Vout).

In the embodiment shown in FIG. 13, the circuitry of frequency multipliers 410 and 412 can be designed with differential inputs and a single ended output with the multiplication factor applied. Alternately, the frequency multipliers 410 and 412 can each include differential to single ended conversion circuitry to generate a single ended signal which is then subjected to frequency multiplication. In yet a further alternate embodiment, the frequency multipliers 410 and 412 can be designed with differential inputs and corresponding differential outputs each subjected to frequency multiplication. Then the other circuits of the phasing cell 210 shown in FIG. 6 and be implemented with differential inputs instead of the shown single ended inputs, with conversion to single ended signals at any suitable part of the circuit.

The frequency of the differential phase conjugate signals +Vout_conj and −Vout_conj are multiplied by factor m1 in transmit frequency multiplier 410, while the differential signals +Vout and −Vout are multiplied by factor m2 in receive frequency multiplier 412.

The multiplication factor configurations of transmit frequency multiplier 410 and receive frequency multiplier 412 can be the same as shown in the embodiments of FIG. 10, FIG. 11 and FIG. 12. If configured as shown in FIG. 10, the design equations to be used would be equation 2 and equation set 3. If configured as shown in FIG. 11, the design equations to be used would be equation 2 and equation set 4. If configured as shown in FIG. 12, the design equations to be used would be equation 2 and equation set 5. Equation 2, equation set 3, equation set 4 and equation set 5 have been previously described.

Figure 14:
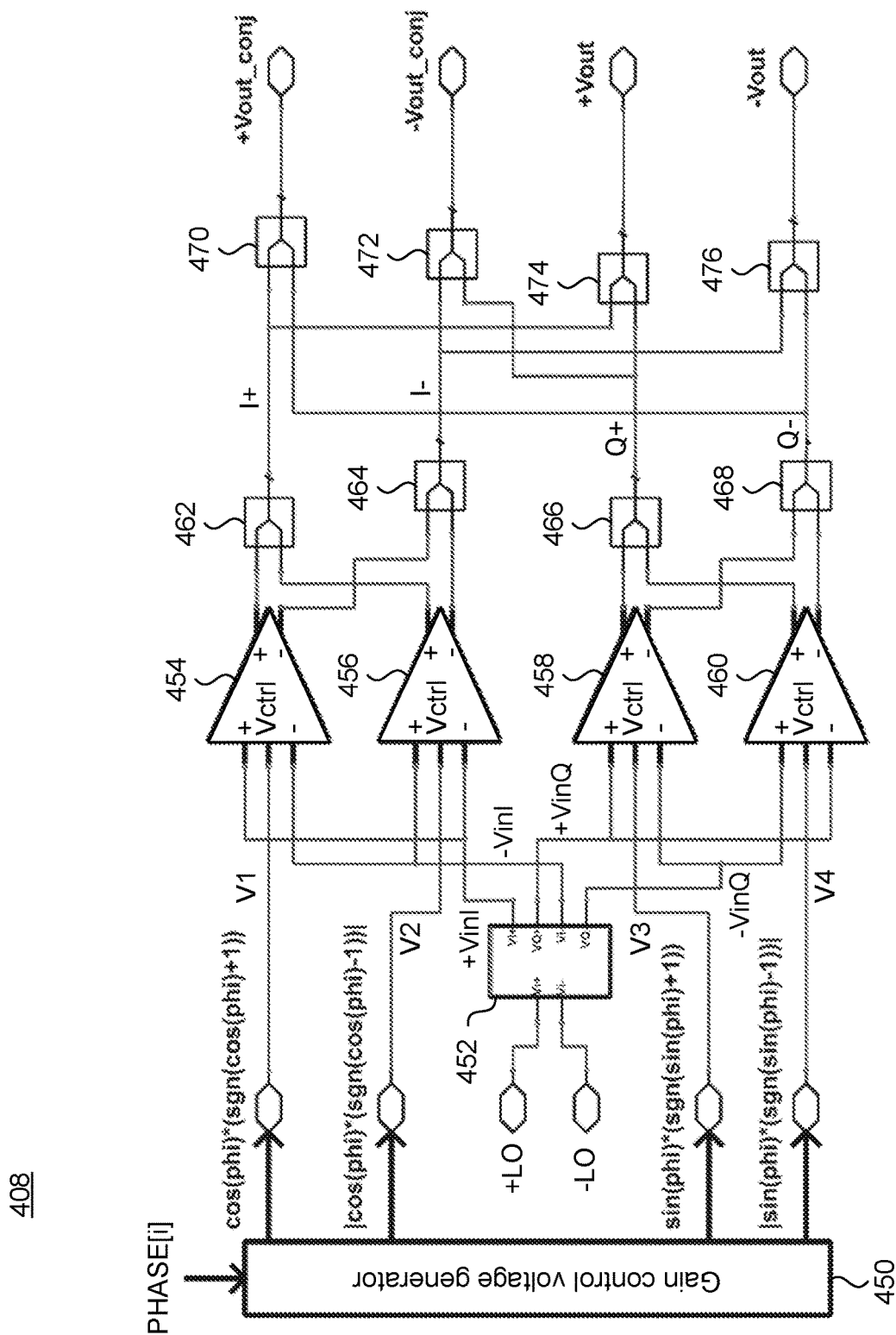
FIG. 14 is a block diagram of the phase conjugating phase shifter shown in FIG. 13, according to a present embodiment; and, FIG. 15 is a circuit schematic of the poly phase filter shown in FIG. 14.

FIG. 14 is a block diagram of the phase conjugating phase shifter 408 shown in FIG. 13. This circuit includes a gain control voltage generator 450, poly phase filter 452, variable gain differential (voltage to voltage) amplifiers 454, 456, 458 and 460, and eight voltage summation circuits 462, 464, 466, 468, 470, 472, 474 and 476. The voltage summation circuits are arranged in two successive stages, with the first stage including voltage summation circuits 462, 464, 466 and 468, and the second stage including voltage summation circuits 470, 472, 474 and 476. It is noted that the amplifiers can be replaced with voltage to current (transconductance) amplifiers and the voltage summation circuits can be replaced with current summation circuits instead.

Beginning with the polyphase filter 452, the differential local oscillator signals +LO and −LO are received at the frequency of f0, to generate differential in-phase (+VinI and −VinI) signals and quadrature (+VinQ and −VinQ) signals. The detailed circuit embodiment showing the generation of these in-phase and quadrature signals follows later in FIG. 15.

Four separate control voltages V1, V2, V3 and V4 are synthesized from the amount of required phase shift ($\varphi$), by the gain control voltage generator 450 in response to signal PHASE[i]. In this embodiment, PHASE[i] can be an analog or digital signal that can effect the phase shift $\varphi$. These four voltages can be mathematically expressed as shown in equation set 6 below, where the value of PHASE[i] is represented by the symbol $\varphi$:

$V1 = \cos(\varphi)[sgn(\cos(\varphi))+1]$ $V2 = |\cos(\varphi)[sgn(\cos(\varphi))-1]|$ $V3 = \sin(\varphi)[sgn(\sin(\varphi))+1]$ $V4 = |\sin(\varphi)[sgn(\sin(\varphi))-1]|$      Equation set 6

The symbol "||" represents the absolute value function, and "sgn" is a function defined as: sgn(x)=−1 if x<0 or +1 if x>0. It is noted that these control voltages have positive values, and in an example embodiment, the voltages of equation set 6 can be between 0V and 1V, but they can be scaled by a constant factor to a range of 0V to that constant factor.

The differential amplifiers 454, 456, 458 and 460 each have a positive input (+), a negative input (−), a control voltage input Vctrl, and provide a differential output (+, −). In the presently shown configuration of the present embodiment, each of the differential amplifiers has a different input connection configuration. Differential amplifiers 454 and 456 each receive +VinI and −VinI, but reversed with respect to each other, while differential amplifiers 458 and 460 each receive +VinQ and −VinQ, but reversed with respect to each other. Differential amplifiers 454, 456, 458 and 460 receive gain control voltages V1, V2, V3 and V4 respectively from the gain control voltage generator 450. The gain of the voltage output $A_v$ of each differential amplifier is proportional to the control voltage it receives and its received input voltage A (i.e. $A_v = AV_{ctrl}$, when A is a constant).

The voltage outputs of differential amplifiers 454 and 456 are provided to voltage summation circuits 462 and 464 in a connection configuration in which the "+" outputs of differential amplifiers 454 and 456 are connected to voltage summation circuits 462, and the "−" outputs of are connected to voltage summation circuits 464. Similarly, the voltage outputs of differential amplifiers 458 and 460 are provided to voltage summation circuits 466 and 468 in a connection configuration in which the "+" outputs of differential amplifiers 458 and 460 are connected to voltage summation circuits 466, and the "−" outputs of are connected to voltage summation circuit 468.

Up to this point, the operation of the phase conjugating phase shifter 408 is similar to that of known vector sum phase shifters. The outputs of the first stage voltage summation circuits are the in-phase signals I+ and I−, and the quadrature signals Q+ and Q−, which are now connected to the inputs of the second stage voltage summation circuits in a specific configuration which results in two outputs that are phase conjugate version of each other. The I+ output of voltage summation circuit 462 is provided to first inputs of voltage summation circuits 470 and 474. The I− output of voltage summation circuit 464 is provided to first inputs of voltage summation circuits 472 and 476. The Q+ output of voltage summation circuit 466 is provided to second inputs of voltage summation circuits 472 and 474. The Q− output of voltage summation circuit 468 is provided to second inputs of voltage summation circuits 470 and 476. The final output +Vout_conj of voltage summation circuit 470 is phase conjugate to the final output +Vout of voltage summation circuit 474, while the final output −Vout_conj of voltage summation circuit 464 is a phase conjugate to the final output −Vout of voltage summation circuit 476. Accordingly, the differential voltage Vout=+Vout−(−Vout) is the phase conjugate of Vout_conj=+Vout_conj−(−Vout_conj). Expressed mathematically, if Vout=Vin $e^{j\varphi}$ then Vout_conj=Vin $e^{-j\varphi}$. In short, the last stage of voltage summation circuits performs vector summation.

Figure 15:
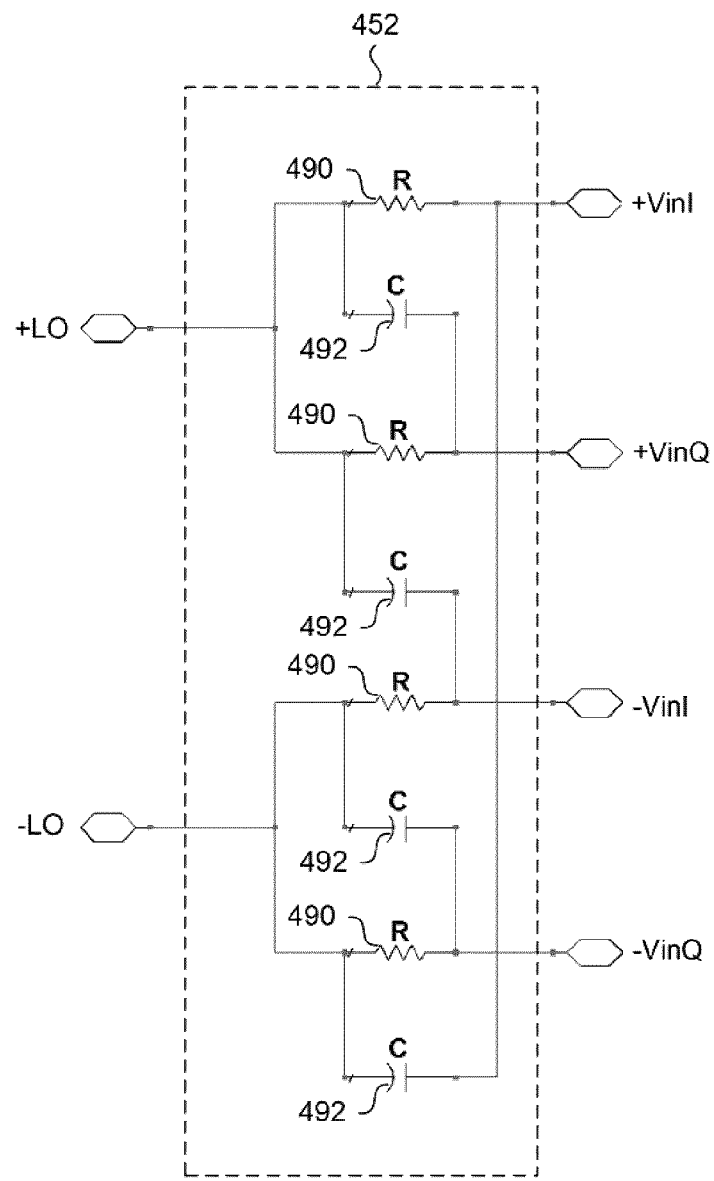

FIG. 15 is a circuit schematic of the poly phase filter 452 shown in FIG. 14, which is well known in the art. In the circuit example of FIG. 15, both +LO and −LO are combined together in four different ways to generate four separate signals +VinI, +VinQ, −VinI, and −VinQ. There are many known types of poly phase filter circuits which can be used for the embodiment of FIG. 14, as long as the following conditions of the outputs are exhibited: if Phase(+VinI)=0, then Phase(+VinQ)=90, Phase(−VinI)=180, and Phase(−VinQ)=270. The example circuit shown in FIG. 15 is a particular circuit configuration consisting of interconnected resistor elements 490 and capacitor elements 492. The values of R and C are related to the frequency of the input signal, $f_0$, by the following relation $f_0 = 1/(2\pi RC)$, $f_0$ in Hz, R in Ohm, and C in Farad.

In the previously described embodiment shown in FIG. 6, diplexers 300 and 310 are used in the phasing cell 210. According to an alternate embodiment, diplexers 300 and 310 can be replaced with other signal path segregating circuits when the local transmit frequency of $f_{Tx\_L}$, the local receive frequency of $f_{Rx\_L}$, the global transmit carrier frequency of $f_{Tx\_G}$ and a global receive carrier frequency of $f_{Rx\_G}$ are different as outlined in the previous embodiments. Accordingly, if diplexers 300 and 310 are each capable of separating transmit and receive signals at the same frequency, the local frequencies $f_{Tx\_L}$, $f_{Rx\_L}$ can be the same, and the global frequencies $f_{Tx\_G}$ and $f_{Rx\_G}$ can be the same, in yet another alternate embodiment. In such an alternate embodiment the aforementioned equations still hold true, where m1=m2, and more specifically, m1=m2=1.

To accommodate systems with changeable transmit and receive frequencies, the frequency multipliers can be designed in such a way that they can provide tunable multiplication factors m1 and m2. The design equation and rest of the system configurations remains the same.

The previously disclosed antenna system embodiments are suitable for any type of wireless communication between two nodes where both nodes are stationary, or at least one of the two nodes is moving. Such as for example in applications where the antenna system 100 is installed in automobiles, trucks, airplanes, trains and ships, or where the antenna system 100 is installed in a mobile device. With wearable technologies, the antenna system 100 can be installed on articles of clothing or other wearable accessories.

As a result of the disclosed embodiments only antenna parameters derived for receive beam control is required to control beamforming of a transmit beam to the source of the receive beam. Accordingly, the transmit beam remains aligned to the receive beam, regardless of the position and orientation of the antenna modules for all scan angles.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An antenna system, comprising:
 a central unit configured to generate control signals for setting beam receive parameters to beam form a received inbound wireless signal from a source to maximize a characteristic of the inbound wireless signal in accordance with a parameter optimization process, during a receive operation; and
 an antenna array configured by values of the control signals to apply first phase shifts to the received inbound wireless signal, and configured by the same values of the control signals to apply second phase shifts to a local outbound signal for setting beam transmit parameters to beam form an outbound wireless signal to the source.

2. The antenna system of claim 1, wherein the antenna array includes at least two antenna modules, and each of the at least two antenna modules receives a set of the control signals.

3. The antenna system of claim 2, wherein each of the at least two antenna modules includes a phasing cell configured to
 receive the inbound wireless signal and apply a receive phase shift to generate a local inbound signal in response to a value of a phase control signal of the received set of the control signals, and receive the local outbound signal and apply a transmit phase shift to generate a global outbound signal in response to the value of the phase control signal.

4. The antenna system of claim 3, wherein
the inbound wireless signal has a global receive frequency,
the outbound wireless signal has a global transmit frequency different than the global receive frequency,
the local inbound signal has a local receive frequency, and
the local outbound signal has a local transmit frequency different than the local receive frequency.

5. The antenna system of claim 3, wherein
the inbound wireless signal has a global receive frequency,
the outbound wireless signal has a global transmit frequency the same as the global receive frequency,
the local inbound signal has a local receive frequency, and
the local outbound signal has a local transmit frequency the same as the local receive frequency.

6. The antenna system of claim 4, wherein the ratio of the global transmit frequency to the global receive frequency is equal to the ratio of the local transmit frequency to the local receive frequency, and is equal to the ratio of m1 to m2, where m1 and m2 are frequency multiplication factors.

7. The antenna system of claim 6, wherein the phasing cell includes
a first mixer configured to mix the local outbound signal with a transmit local oscillator signal to generate the outbound wireless signal,
a second mixer configured to mix the global inbound signal with a receive local oscillator signal to generate the local inbound signal, and
an adjustable local oscillator generator configured to generate the transmit local oscillator signal and the receive local oscillator signal in response to the value of the phase control signal, where the ratio of a phase of the transmit local oscillator signal to a phase of the receive local oscillator signal is equal to the ratio of the global transmit frequency to the global receive frequency at each phasing cell.

8. The antenna system of claim 7, wherein the adjustable local oscillator generator includes
a transmit and receive local oscillator phase shifting block configured to phase shift a received local oscillator signal to provide a first phase shifted local oscillator signal in response to the value of the phase control signal, and configured to conjugate the phase of the first phase shifted local oscillator signal to provide a second phase shifted local oscillator signal, and
a frequency multipliers circuit block configured to generate the transmit local oscillator signal and the receive local oscillator signal, where the ratio of the phase of the transmit local oscillator signal to the phase of the receive local oscillator signal is equal to the negative ratio of frequency multiplication factors m1 to m2 applied to the first phase shifted local oscillator signal and the second phase shifted local oscillator signal.

9. The antenna system of claim 8, wherein the transmit and receive local oscillator generator includes
a phase shifter for phase shifting the local oscillator signal in response to the value of the phase control signal for generating the first phase shifted local oscillator signal, and
a phase conjugator for mixing the first phase shifted local oscillator signal with a frequency doubled version of the local oscillator signal to generate the second phase shifted local oscillator signal.

10. The antenna system of claim 9, wherein the frequency multipliers circuit block includes
a first frequency multiplier for multiplying the first phase shifted local oscillator signal by m1 to provide the transmit local oscillator signal, and
a second frequency multiplier for multiplying the second phase shifted local oscillator signal by m2 to provide the receive local oscillator signal.

11. The antenna system of claim 7, wherein the adjustable local oscillator generator includes
a phase conjugating phase shifter configured to generate a first pair of differential signals and a second pair of differential signals from a received differential local oscillator signal in response to the value of the phase control signal, where a first signal of the first pair of differential signals is conjugate of a first signal of the second pair of differential signals, and a second signal of the first pair of differential signals is conjugate of a second signal of the second pair of differential signals, and the amount of phase shift can be changed while the outputs are phase conjugated, and
a frequency multipliers circuit block configured to convert the first and second pairs of differential signals into respective first and second single ended signals, and to multiply the frequencies of the first and second single ended signals by frequency multiplication factors m1 and m2 to provide the transmit local oscillator and the receive local oscillator signal, where the ratio of the phase of the transmit local oscillator signal to the phase of the receive local oscillator signal is equal to the ratio of frequency multiplication factors m1 to m2 applied to the first single ended signal and the second single ended signal.

12. The antenna system of claim 3, wherein the central unit is in wireless communication with the at least two antenna modules to receive the local inbound signal and to provide the local outbound signal.

13. The antenna system of claim 3, wherein the central unit is configured to receive a source selection signal for monitoring characteristics of the received inbound signal corresponding to the source having a corresponding ID number.

14. A method for controlling an antenna array, comprising:
generating control signals for setting beam receive parameters to beam form a received inbound wireless signal from a source to maximize a characteristic of the inbound wireless signal in accordance with a parameter optimization process, during a receive operation;
configuring the antenna array with the beam receive parameters for applying first phase shifts to the received inbound wireless signal in response to values of the control signals; and
configuring the antenna array with beam transmit parameters for applying second phase shifts to a local outbound signal in response to the same values of the control signals to beam form an outbound wireless signal to the source in a transmit operation.

15. The method of claim 14, further including selecting the source in response to a source selection signal that corresponds to an ID number of the source, before generating the control signals.

16. The method of claim 14, wherein generating control signals includes
monitoring the characteristic of the inbound wireless signal, and changing values of the control signals in accordance with a parameter optimization process until the characteristic is maximized.

17. The method of claim 16, further including receiving a further inbound wireless signal and determining if the characteristic has degraded to a predetermined threshold.

18. The method of claim 17, wherein the step of generating control signals is repeated when the characteristics have degraded to the predetermined threshold.

19. The method of claim 14, wherein configuring the antenna array with the beam receive parameters includes
applying the first phase shifts to copies of the inbound wireless signal in response to the values of the control signals to obtain constructive interference of the phase shifted copies of the inbound wireless signal.

20. The method of claim 15, wherein configuring the antenna array with the values of the control signals for setting beam transmit parameters includes
applying the second phase shifts to copies of the local outbound signal in response to the values of the control signals to obtain constructive interference of the phase shifted copies of the local outbound signal to form the outbound wireless signal.

\* \* \* \* \*